Sept. 28, 1937.                W. F. SHEFFIELD                 2,094,416
                            DRILLING SHAFT COUPLING
                             Filed Sept. 4, 1936
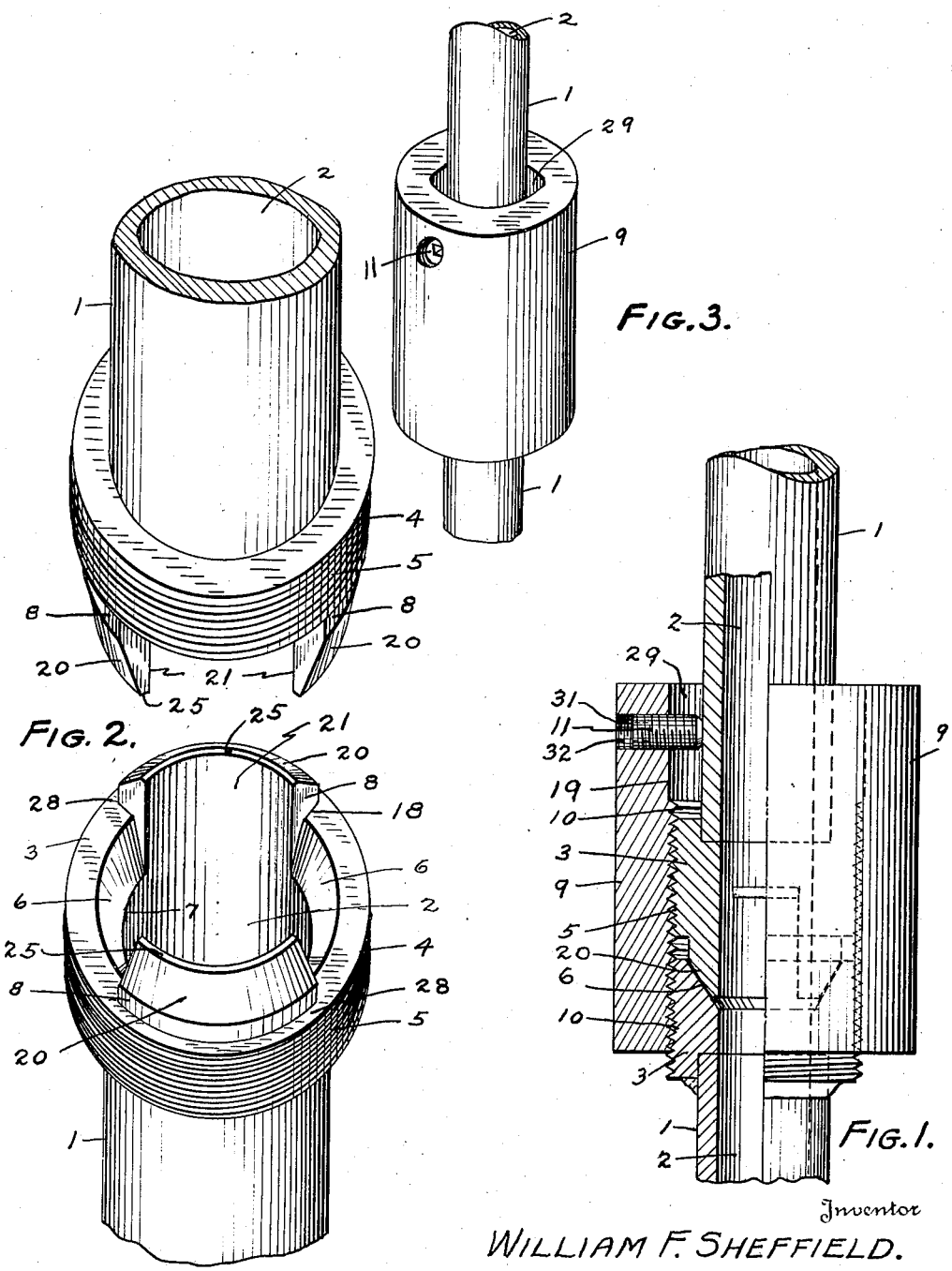
Inventor
WILLIAM F. SHEFFIELD.
By Howard J. Whelan.
                Attorney Patented Sept. 28, 1937

2,094,416

UNITED STATES PATENT OFFICE 2,094,416

DRILLING SHAFT COUPLING

William F. Sheffield, Sparrows Point, Md.

Application September 4, 1936, Serial No. 99,369

2 Claims. (Cl. 285—146)

This invention refers to well drilling equipment and more particularly to the hollow drilling shafts used in connection with such in oil drilling projects.

It has, among its objects, to provide in well drilling shafts, an arrangement for coupling these kinds of shafts together effectively, and substantially enough to prevent their unloosening when in operation and use in an oil well. Another object is to have the coupling of a self-aligning type and adapted to make a close and neat fit and connection. A further object is to have the coupling designed for easy connection when the shafts are being assembled and jointed together; and for easy disconnection when the occasion definitely requires it. Still another object is to have the whole arrangement of simple and rugged construction and protected from exterior and interior deterioration and effects. A still further object is to have the coupling arrangement proper of the device so arranged that the shafts will not turn or twist in such a manner as to cause them to bind or "freeze" together. Other objects will become apparent as the invention is more fully set forth.

This invention consists of a conventional hollow drilling shaft for oil wells and the like, provided with ends having flanged or enlarged members on same, with sections bevelled and cut-away to alternately insert or mesh with adjacent connecting shafts at either end. The ends are joined to adjacent ones and then secured with typical or conventional types of coupling having a locking arrangement to prevent same from turning. The usual type of connection permits the joints of these types of drilling shafts to turn and either unloosen or "freeze on." In unloosening, irreparable damage may be caused to the well by the drilling shafts and its connections by "jamming up" the well, even to the extent of causing its abandonment. It is a frequent practice, when these shafts unloosen in the well casing, to have the operatives spend several months in fishing the pieces out. This causes considerable expense and trouble and renders the operation of drilling the well a matter of considerable uncertainty. This invention avoids these difficulties and waste of time, by providing a coupling arrangement that is positively certain to remain connected and at the same time not liable to become "frozen-in."

In the drawing which indicates, by way of example, an embodiment of this invention:

Figure 1 is a view partly in section showing a modification of a drilling shaft and coupling connection, Figure 2 is a perspective view of the device with ends separated to indicate their construction, Figure 3 is a perspective view of an assembly of the coupling complete, in position on a drilling shaft.

Similar reference characters refer to similar parts throughout the drawing.

In the construction shown in the drawing, 1 represents the cylindrical wall of the barrel of an oil drilling shaft, having an interior passage 2 within it. The end portions 3 of the shaft are arranged with symmetrical coupling jaws consisting of an enlarged peripheral portion 4 of cylindrical form having an exterior surface screw threaded at 5 to engage with the interior screw threaded portion 10 of a conventional coupling member 9. This coupling member is provided to secure the adjacent coupling jaws of shafts being coupled together and may be integral or secured in place. The passage 2 of the shaft is enlarged at the jaws to make a throat 7. The surface of the walls 6 surrounding the throat are funnelled outwardly by bevelling the same as indicated. Projection prongs 8 are spaced at various locations on the surface of the rim 18 of the coupling jaws, and intended to insert themselves snugly in the adjacent jaw with the exterior surfaces 20 against the interior bevelled surfaces 6 of the adjacent coupling jaw. The prong is spaced from the peripheral side 4 as indicated at 28. The interior surface of the prong 21 aligns with the surface around the passage 2. They are made in plural quantity spaced apart to form spaces in which the prongs of the connecting coupling jaw may properly mesh and form a closed connection between drilling shafts. When this is done, the coupling member 9 is brought on the adjacent and touching portions 4 and the screw threads 10 engaged with the screw thread surfaces 5 of the coupling jaws, and the latter held together in alignment thereby. After the coupling 9 is positioned on the coupling jaws, a locking device 11 is set to lock the coupling and shaft 1 together in definite relation to one another. This prevents them moving in relation to each other and unloosening the coupling member 9 from the screw threaded portions 5. After the coupling jaws are thus connected, the shafts are pushed further into the oil well, and if necessary, additional shafts are attached consecutively. The disconnection is made in the reverse order of the connection process. The upper inner surface of the coupling at 19 is preferably smoothed off and without screw threads, and is spaced away at 29 from the wall of the shaft. The locking device 11 is set in a hole 31 having a portion 32 screw-threaded. The locking device 11 is shown in this drawing as a headless set-screw, the point of which locks into the wall of the shaft as shown. The bevel 6 starts from the wall of the passage 2 to flare out towards the orifice of the coupling jaw.

The coupling jaws, when connected, form a tight joint and do not obstruct the passage through the drilling shaft. The end rims 25 are flattened preferably as indicated. The jaws are securely locked when the prongs are inserted into the adjacent throats and are locked against movement in relation to each other by the meshing that is arranged. The locking device additionally secures the coupling member and incidently, the jaws securely, and the connected shafts form one rigid shaft.

Having thus described the invention, and an illustration of its principles provided, and while only one form is indicated, it is not desired to limit this application for patent to this particular form of construction or in any other way, otherwise than limited by the prior art, as it is appreciated that other forms could be used that would use the same principles and come within the scope of the appended claims.

What is claimed is:

1. A coupling for oil drilling shafting comprising in combination, coupling jaws having their peripheral portions of cylindrical form and exteriorly screw-threaded, and adapted for mounting on the end portions of the said shafting, said jaws having internal throats funnelled outwardly, projecting prongs mounted on the jaws with their inside surfaces parallel and aligned with the internal surface of the shafting, and forming an extension to the internal diameter thereof, the external portions of the prongs being bevelled towards the axis of the shafting adaptable to align and closely engage with the funnelled surfaces aforesaid, the funnelled surfaces and prongs joining and interlocking with each other respectively, a coupling member for surrounding the coupling jaws, holding same together and engaging with the exterior screw threads, and means for locking the coupling to the shafting.

2. A coupling for oil drilling shafting comprising in combination, coupling jaws having their peripheral portions of cylindrical form and exteriorly screw-threaded, and adapted for mounting on the end portions of the said shafting, said jaws having internal throats funnelled outwardly, projecting prongs mounted on the jaws with their inside surfaces parallel and aligned with the internal surface of the shafting, and forming an extension to the internal diameter thereof, the external portions of the prongs being bevelled towards the axis of the shafting adaptable to align and closely engage with the funnelled surfaces aforesaid, the funnelled surfaces and prongs joining and interlocking with each other respectively, a coupling member for surrounding the coupling jaws, holding same together and engaging with the exterior screw threads, means for locking the coupling to the shafting, and an apron for the coupling extending beyond the exterior screw threads for holding said means.

WILLIAM F. SHEFFIELD.